3,832,362
EPOXIDIZED ALKYLIDENE AND ARYLIDENE INDANDIONES
Willy Leimgruber, Montclair, and Manfred Weigele, North Caldwell, N.J., assignors to Hoffmann-La Roche Inc., Nutley, N.J.
No Drawing. Filed May 18, 1972, Ser. No. 254,601
Int. Cl. C07d 1/00
U.S. Cl. 260—348 R            2 Claims

ABSTRACT OF THE DISCLOSURE

Method for the preparation of compounds of the formula

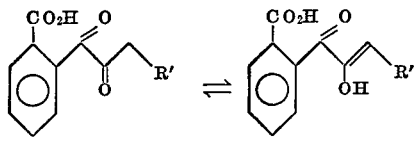

wherein R' is lower alkyl or aryl, useful as intermediates for fluorometric reagents, comprising condensation of 1,3-indandione with a lower alkyl or aryl aldehyde, epoxidation and basic cleavage.

DETAILED DESCRIPTION OF THE INVENTION

The present invention relates to a novel process for the preparation of compounds represented by formula I

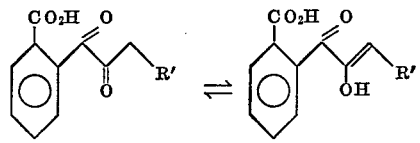

wherein R' is lower alkyl or aryl.

Compounds of formula I are intermediates for fluorometric reagents, which reagents are described in pending U.S. Patent Application Ser. No. 212,790 of Willy Leimgruber and Manfred Weigele, filed Dec. 27, 1971 and now U.S. Pat. No. 3,812,181.

In the specification and the appended claims, the term "lower alkyl" shall mean a monovalent, saturated, straight or branched chain hydrocarbon substituent containing up to and including eight carbon atoms such as methyl, ethyl, butyl, hexyl, octyl, isopropyl, tert-butyl, and so forth. The term "aryl" shall mean an aromatic ring system which may be substituted with one or more of the following: halogen (i.e., fluorine, chlorine, bromine or iodine), lower alkyl, lower alkoxy, nitro, cyano, and so forth. Exemplary aromatic ring systems include phenyl, naphthyl, furyl, thienyl, pyrrolyl, imidazolyl, pyridyl, pyrimidinyl, indolyl, quinolyl, oxazolyl, isoxazolyl, and so forth. The term "lower alkoxy" shall mean a substituent having a lower alkyl group linked to an ether oxygen and having its free valence bond from the ether oxygen. Examples of lower alkoxy groups are methoxy, ethoxy, butoxy, isopropoxy, tert-butoxy, and so forth.

Compounds of formula I are depicted herein as existing in both a diketo and enol form. It should be understood that the ratio of these two tautomeric forms can vary depending upon solvent, temperature, pH, and so forth. In the specific examples, compounds of formula I are named as the enol form for convenience only.

The process of the present invention will be more fully appreciated by reference to the following reaction scheme:

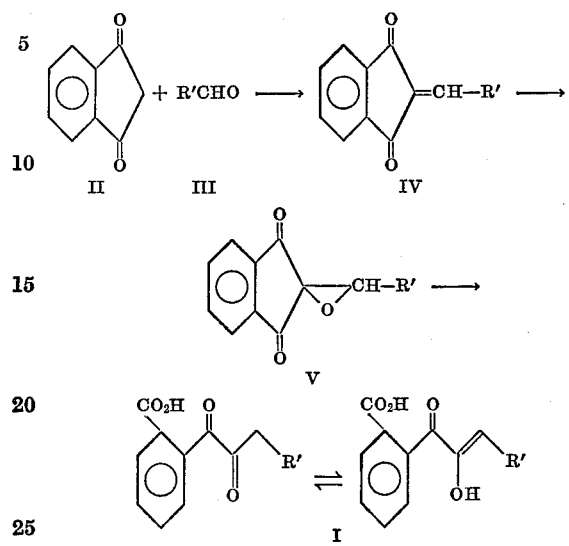

The starting material for the present process is the readily available and relatively inexpensive chemical 1,3-indandione (II). A convenient synthesis for this material has recently been described by Gruen and Norcross, J. Chem. Educ., volume 42, page 268 (1965).

The first step of the reaction sequence involves condensation of 1,3-indandione with the appropriate lower alkyl or aryl aldehyde of formula III. This condensation can be effected by a number of well-known means. The condensation of 1,3-indandione with benzaldehyde has previously been described by Ionescu, Bull. Soc. Chem. France, 1930, page 210. This particular condensation involves the use of sodium hydroxide in an alcoholic solvent. Other reaction conditions which are especially suitable for the present condensation are those used for the standard Knoevenagel condensation. In this procedure, the condensation between the 1,3-indandione and the aldehyde is carried out in the presence of a secondary organic amine, with concomitant removal of the water of reaction. Suitable secondary amines for this condensation include acyclic amines such as diethylamine and cyclic amines such as piperidine, morpholine or pyrrolidine. Normally, only a catalytic amount, for example 0.1 to 1.0 mole percent of secondary amine need be used. Suitable solvents for this condensation reaction include those that form azeotropes with water, such as benzene, toluene or xylene. Frequently, it is desired to utilize as solvent, or a co-solvent with one of the aforementioned solvents, an aromatic amine such as pyridine or a tertiary amine such as triethylamine. It is preferred to remove the water of reaction either by azeotropic distillation or, alternatively, by trapping the water with a trapping agent such as molecular sieves.

The condensation reaction is normally effected at an elevated temperature, preferably the reflux temperature of the solvent medium. When azeotropic removal of water is desired, it is most efficient to carry out the reaction at or near the reflux temperature of the reaction medium.

In the next step, the alkylidene or arylidene indandione of formula IV is epoxidized to afford the epoxide of formula V. The epoxidation is carried out by means of hydrogen peroxide in the presence of a low concentration of a basic catalyst in an inert solvent.

Generally, a molar amount of hydrogen peroxide is used in the epoxidation reaction, although it is preferred to utilize a slight excess, for example a 10 to 20% excess.

Suitable inert solvents for the epoxidation reaction include, for example, water, lower alkanols such as methanol, and mixtures of the above.

As basic catalysts, there may be employed an alkali metal hydroxide such as sodium hydroxide or an alkali metal carbonate such as sodium carbonate. The amount of basic catalyst utilized is in the range of from about 0.1 to about 5 mole percent. The concentration of catalyst in the reaction medium should be kept below 0.1 molar, to prevent opening of the epoxide ring.

The temperature of the epoxidation reaction is generally in the range of from about 0° to about 25° C., preferably 0° to 10° C.

The order of addition of reagents is not critical, although it is generally preferred to add the hydrogen peroxide and the basic catalyst to the compound of formula IV. Most preferably, the basic catalyst is added slowly, as the last component, which allows for better control of the temperature.

The conversion of the epoxide of formula V to the compound of formula I is effected by a novel basic cleavage reaction in aqueous media in which the epoxide ring as well as the cyclopentandione ring is cleaved.

Suitable bases for the present cleavage reaction are strong bases such as alkali metal hydroxides, e.g., sodium hydroxide. To achieve maximum conversion, it is necessary to use a molar equivalent of base although generally a molar excess from about 2 to 10 fold of the base is utilized. The concentration of base in the reaction medium is preferably above 0.5 molar, up to about 5.0 molar, most preferably about 2 molar.

As suitable solvent media there may be mentioned water and mixtures of water with miscible organic solvents such as lower alkanols, e.g., methanol or ethanol, ethers, e.g., tetrahydrofuran or dioxane, and so forth.

The temperature of the cleavage reaction is not critical and may range from about 0° to the reflux temperature of the reaction medium. It is generally preferred to carry out the present reaction at a temperature of from about 20° to about 40° C.

The reaction product, as formed, is present in solution as an alkali metal salt. The compound of formula I is isolated from the reaction medium by acidification of the reaction mixture to free the acid from its alkali metal salt. This acidification may be effected by treatment of the crude reaction mixture with an acid stronger than the acid of formula I. Suitable acids are sulfuric acid; organic sulfonic acids, e.g., p-toluenesulfonic acid; and so forth. The freed acid of formula I may then be isolated by standard techniques such as extraction, crystallization, and so forth.

The process of the present invention may be more fully understood by reference to the following specific examples. All temperatures stated are in degrees centigrade.

EXAMPLE 1

2-Benzylidene-indan-1,3-dione

Into a 1-l. round bottom flask, equipped with a Dean-Stark trap and a reflux condenser, were placed 73.0 g. 1,3-indandione (Aldrich Chemical Co.), 350 ml. benzene, 53.0 g. benzaldehyde and finally 0.5 ml. piperidine. The mixture was heated at reflux temperature under $N_2$ until the theoretical amount of water (8 ml.) had collected in the trap. It was then allowed to cool to room temperature. Crystalline product precipitated. It was filtered off, washed on the filter with ether/petroleum ether (b.p. 30–60°) (1:2) and air dried to give 91.0 g. pale green crystals, m.p. 150–152°. The filtrate was evaporated to dryness under reduced pressure. The residue was redissolved in chloroform and the resulting solution was filtered through silica gel (ca. 400 g.). The filtrate was evaporated to dryness and the residue was recrystallized from benzene/ether to give an additional crop of 12.1 g. pale green crystals, m.p. 150–152°. The total yield was 103.1 g. (88%) of 2-benzylidene-indan-1,3-dione, sufficiently pure for the next step.

An analytical sample, recrystallized from methanol, had m.p. 152–153°.

Calcd. for $C_{16}H_{10}O_2$ (MW 234): C, 82.04; H, 4.30. Found: C, 81.76; H, 4.65.

Utilizing the above procedure and replacing benzaldehyde with the appropriate aldehyde of formula III, there are prepared the following compounds of formula IV wherein R' is:

| | |
|---|---|
| 2-methoxyphenyl | 3,4-methylenedioxyphenyl |
| 3-methoxyphenyl | 3-chlorophenyl |
| 4-methoxyphenyl | 4-chlorophenyl |
| 2,4-dimethoxyphenyl | 4-bromophenyl |
| 2,5-dimethoxyphenyl | 3-indolyl |
| 3,5-dimethoxyphenyl | 2-naphthyl |
| 3,4,5-trimethoxyphenyl | 1-naphthyl |
| 2,4,5-trimethoxyphenyl | |
| n-propyl | |

EXAMPLE 2

3-Phenylspiro[oxirane-2,2'-indan]-1',3'-dione

Into a 2-l. three-neck flask, equipped with a stirrer and a dropping funnel were placed 96.0 g. 2-benzylidene-indan-1,3-dione, prepared as in Example 1, 1,000 ml. methanol and 60 ml. 30% hydrogen peroxide. The mixture was cooled to 5° C. and 10 ml. 1N sodium hydroxide solution were added dropwise at such a rate as to keep the temperature below 15° C. After completed addition, stirring was continued at room temperature for another 30 minutes. The mixture was then poured into 4.5 l. water. The resulting crystalline precipitate was collected by filtration and washed on the filter repeatedly with water. The material was dried overnight in a vacuum oven at room temperature. There were obtained 101.0 g. (98.5%) of 3-phenylspiro[oxirane - 2,2' - indan]-1',3'-dione as white crystals, m.p. 154–6°. The product was pure enough for the next step.

An analytical sample, recrystallized from ethyl acetate, had m.p. 158°.

Calcd. for $C_{16}H_{10}O_3$ (MW 250): C, 76.79; H, 4.03 Found: C, 77.07; H, 4.02

Utilizing the above procedure and replacing 2-benzylidene-indan-1,3-dione with the appropriate compound prepared in Example 1, there are prepared the following compounds:

3-(2-methoxyphenyl)spiro[oxirane-2,2'-indan]-1',3'-dione 3-(3-methoxyphenyl)spiro[oxirane-2,2'-indan]-1',3'-dione 3-(4-methoxyphenyl(spiro[oxirane-2,2'-indan]-1',3'-dione 3-(2,4-dimethoxyphenyl)spiro[oxirane-2,2'-indan]-1,3-dione 3-(2,5-dimethoxyphenyl)spiro[oxirane-2,2'-indan]-1',3'-dione 3-(3,5-dimethoxyphenyl)spiro[oxirane-2,2'-indan]-1',3'-dione 3-(3,4,5-trimethoxyphenyl)spiro[oxirane-2,2'-indan]-1',3'-dione 3-(2,4,5-trimethoxyphenyl)spiro[oxirana-2,2'-indan]-1',3'-dione 3-(3,4-methylenedioxyphenyl)spiro[oxirane-2,2'-indan]-1',3'-dione 3-(3-chlorophenyl)spiro[oxirane-2,2'-indan]-1,3'-dione 3-(4-chlorophenyl)spiro[oxirane-2,2'-indan]-1',3'-dione
3-(4-bromophenyl)spiro[oxirane-2,2'-indan]1',3'-dione
3-(3-indolyl)spiro[oxirane-2,2'-indan]-1',3'-dione
3-(2-naphthyl)spiro[oxirane-2,2'-indan]-1',3'-dione
3-(1-naphthyl)spiro[oxirane-2,2'-indan]-1',3'-dione
3-(n-propyl)spiro[oxirane-2,2'-indan]-1',3'-dione

EXAMPLE 3 o-(α-Hydroxycinnamoyl)benzoic acid

To a stirred suspension of 20.0 g. 3-phenylspiro-[oxirane-2,2'-indan]-1',3'-dione, prepared as in Example 2, in 200 ml. 10% aqueous sodium hydroxide was added 50 ml. methanol. The reaction became slightly exothermic. The temperature was kept below 35° by external cooling. Stirring was continued for 3½ hours. The reaction mixture was then poured into 2 l. water. The resulting alkaline solution was washed with 500 ml. ether. The ether extract was discarded. The aqueous phase was acidified with 10% hydrochloric acid and extracted with chloroform. The chloroform extract was washed with water, dried over sodium sulfate and evaporated under reduced pressure. The crystalline residue was slurried in 500 ml. petroleum ether, containing 10% ether. The suspension was filtered and the solid was air dried to give 18.98 g. (89%) o-(α-hydroxycinnamoyl)benzoic acid, m.p. 106–115°. Analytically pure product, m.p. 106–115° was obtained by recrystallization from methylene chloride/petroleum ether.

Calcd. for $C_{16}H_{12}O_4$ (MW 268): C, 71.63; H, 4.51
Found: C, 71.73; H, 4.58

Utilizing the above procedure and replacing 3-phenylspiro[oxirane-2,2'-indan]-1',3'-dione with the appropriate compound prepared in Example 2, there are prepared the known compounds of formula I wherein R' is:

| | |
|---|---|
| 2-methoxyphenyl | 3,4-methylenedioxyphenyl |
| 3-methoxyphenyl | 3-chlorophenyl |
| 4-methoxyphenyl | 4-chlorophenyl |
| 2,4-dimethoxyphenyl | 4-bromophenyl |
| 2,5-dimethoxyphenyl | 3-indolyl |
| 3,5-dimethoxyphenyl | 2-naphthyl |
| 3,4,5-trimethoxyphenyl | 1-naphthyl |
| 2,4,5-trimethoxyphenyl | |

We claim:
1. A compound of the formula

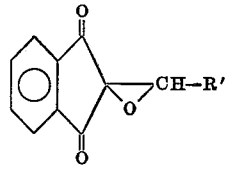

wherein R' is lower alkyl, phenyl, naphthyl or phenyl substituted with one halogen or one to three lower alkoxy groups.

2. The compound of claim 1 wherein R' is phenyl.

References Cited

A. Schoenberg et al., Ber. Deut. Chem. Ges., vol. 96 (1963), pp. 3330–1.

NORMA S. MILESTONE, Primary Examiner

U.S. Cl. X.R.

260—251 R, 287 R, 289 R, 295 R, 297 B, 307 R, 307 H, 309, 326.3, 326.5 D, 326.13 R, 326.16, 332.2 A, 332.3, 347.3, 347.8, 340.9, 521 R